US009992557B2

(12) United States Patent
Merrell et al.

(10) Patent No.: US 9,992,557 B2
(45) Date of Patent: Jun. 5, 2018

(54) RACK MOUNTABLE SECURITY ENCLOSURES

(71) Applicant: Hubbell Incorporated, Shelton, CT (US)

(72) Inventors: Richard James Merrell, New Haven, CT (US); Douglas Paul O'Connor, Richmond, RI (US)

(73) Assignee: Hubbell Incorporated, Shelton, CT (US)

( * ) Notice: Subject to any disclaimer, the term of this patent is extended or adjusted under 35 U.S.C. 154(b) by 0 days. days.

(21) Appl. No.: 15/352,061

(22) Filed: Nov. 15, 2016

(65) Prior Publication Data

US 2017/0150632 A1 May 25, 2017

Related U.S. Application Data

(60) Provisional application No. 62/257,451, filed on Nov. 19, 2015.

(51) Int. Cl.
*H02B 1/20* (2006.01)
*H04Q 1/02* (2006.01)

(52) U.S. Cl.
CPC .................... *H04Q 1/09* (2013.01)

(58) Field of Classification Search
CPC ........................................ H04Q 1/09
USPC ................................. 361/825–826
See application file for complete search history.

(56) References Cited

U.S. PATENT DOCUMENTS

| 4,729,614 | A | 3/1988 | Nadler et al. |
| 6,365,834 | B1* | 4/2002 | Larsen ................ H02G 3/0443 174/100 |
| 6,425,488 | B1* | 7/2002 | Notohardjono ...... H05K 7/1495 211/182 |
| 7,009,839 | B2 | 3/2006 | Clinard |
| 7,787,260 | B2* | 8/2010 | Hruby ................. G02B 6/4452 361/825 |
| 7,815,065 | B2 | 10/2010 | Gosche |
| 7,946,433 | B2 | 5/2011 | Nguyen |
| 8,040,693 | B2* | 10/2011 | Blomquist ............... H04Q 1/02 174/481 |
| 8,459,756 | B2 | 6/2013 | Linhares, Jr. et al. |
| 8,464,984 | B2* | 6/2013 | Laursen .................. F16L 3/221 211/26 |
| 8,966,821 | B2* | 3/2015 | Walker .................. E05D 7/1061 49/193 |
| 9,019,707 | B2* | 4/2015 | Xu ........................ H05K 7/1492 312/223.2 |

(Continued)

OTHER PUBLICATIONS

SecurePATCH™ Security Cover Brochure, 2 pages, Oct. 31, 2009.

(Continued)

*Primary Examiner* — Hung S Bui
(74) *Attorney, Agent, or Firm* — Wissing Miller LLP

(57) ABSTRACT

A rack mountable security enclosure includes a top panel, a bottom panel, a first side cable rack perpendicular to and extending between the top and bottom panels, a second side cable rack perpendicular to and extending between the top and bottom panels, the top and bottom panels and the first and second side cable racks forming an opening providing access to electronic equipment when the rack mountable security enclosure is mounted to an equipment rack and a lockable door covering the opening.

27 Claims, 13 Drawing Sheets

(56) References Cited

U.S. PATENT DOCUMENTS

| | | | |
|---|---|---|---|
| 9,329,645 B2* | 5/2016 | Ning | G06F 1/20 |
| 2004/0050808 A1* | 3/2004 | Krampotich | H04Q 1/035 |
| | | | 211/26 |
| 2007/0146997 A1 | 6/2007 | Foster, Sr. | |
| 2013/0039002 A1* | 2/2013 | Li | H05K 7/1492 |
| | | | 361/679.48 |
| 2013/0063894 A1* | 3/2013 | Wang | H05K 7/1492 |
| | | | 361/692 |
| 2015/0282383 A1 | 10/2015 | Singh et al. | |

OTHER PUBLICATIONS

Cooper B-Line Brochure, CDRSP-12-Rack Security Products—Patch Panel Protectors, Server Boots and Doors; 6 pages, 2012.

Pathways Spaces SecurePATCH™ Datasheet, 2012, 2 pages.

* cited by examiner

RACK MOUNTABLE SECURITY ENCLOSURES

CROSS REFERENCE TO RELATED APPLICATIONS

The present disclosure is based on and claims benefit from U.S. Provisional Application Ser. No. 62/257,451 filed Nov. 19, 2015 entitled "Rack Mountable Security Enclosures" the entire contents of which are herein incorporated by reference.

BACKGROUND

Field

The present disclosure relates to security enclosures and, more particularly, to rack mountable security enclosures.

Description of the Related Art

Data and communication centers often house network infrastructure components and network devices, such as switches, routers, relays, servers, storage devices, patch panels, and other electronic equipment. The electronic equipment is often mounted to a structure such as an equipment rack. An equipment rack is generally a metal frame that is designed and dimensioned such that the electronic equipment can be stacked one above the other. Electronic equipment are generally secured to a front surface of the rack by, for example, screws or clips. One or more cables are generally attached to each piece of electronic equipment. For example, cables may run between pieces of electronic equipment on a single rack and/or to other electronic equipment remote from the rack. A rack of electronic equipment may have hundreds of cables.

The rack is generally an open structure. Accordingly, this provides open access to the electronic equipment. One problem with this arrangement is that in addition to allowing operators and technicians access to the electronic equipment, those with nefarious intentions will also have access. These nefarious intentions may include any type of tampering, sabotage, theft or other action that can cause disruption to the electronic equipment. One solution is to place the equipment rack in a locked room. However, organizations often have tens or hundreds of racks of electronic equipment which may need to be serviced by different technicians/vendors. Allowing a technician/vendor access to the room to service a specific rack also provides them unnecessary access to the other racks.

Additional types of security may be provided to limit access to electronic equipment. For example, cabinets having side panels and a locking door may be utilized to secure all of the electronic equipment in the cabinet. For example, technicians from many different vendors may need access to the electronic equipment in a cabinet. Unlocking the cabinet to allow various service personnel to work on a piece of network equipment exposes all network equipment within the cabinet to theft or tampering. Further, the addition of cabinets adds more complexity for testing and repair service personnel in terms of limited access to the interior of the cabinet, which increases service times and costs. Further, the cost of the cabinets and the additional space requirements increases the overall cost of the installation.

In addition to the above-noted access/security problems with present rack and cabinet enclosures, the cabling going to and from the electronic equipment in the rack or cabinet may also present problems. As noted above, a rack or cabinet may have hundreds of cables coming from or going to electronic equipment in the rack or cabinet. For a rack or cabinet having a locking door, the cabling can get in the way when closing the door. If pinched by a door being closed, a cable's integrity can be compromised. A damaged cable can take numerous man hours to detect and can cause otherwise working electronic equipment to be needlessly replaced.

SUMMARY

The present disclosure provides embodiments of rack mountable security enclosures. In an exemplary embodiment, the rack mountable security enclosure includes a top panel, a bottom panel, first and second side cable racks and a lockable door secured to the top and bottom panels. The first side cable rack is preferably perpendicular to and extending between the top and bottom panels. The second side cable rack is preferably perpendicular to and extending between the top and bottom panels. The top and bottom panels and the first and second side cable racks form an opening providing access to electronic equipment when the rack mountable enclosure is mounted to an equipment rack. The lockable door covers the opening.

In another exemplary embodiment, the rack mountable security enclosure includes a top panel, a bottom panel, first and second side racks and a lockable door. The first and second side racks each include a plurality of fingers. Each side rack is preferably perpendicular to and extending between the top and bottom panels. The top and bottom panels and the first and second side racks form an opening providing access to electronic equipment when the rack mountable enclosure is mounted to an equipment rack. The lockable door covers the opening.

The present disclosure also provides embodiments of rack assemblies. In an exemplary embodiment, the rack assembly includes an equipment rack and at least one security enclosure secured to the equipment rack. The at least one rack mountable security enclosure includes a top panel, a bottom panel; first and second side cable racks and a lockable door similar to those described above.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
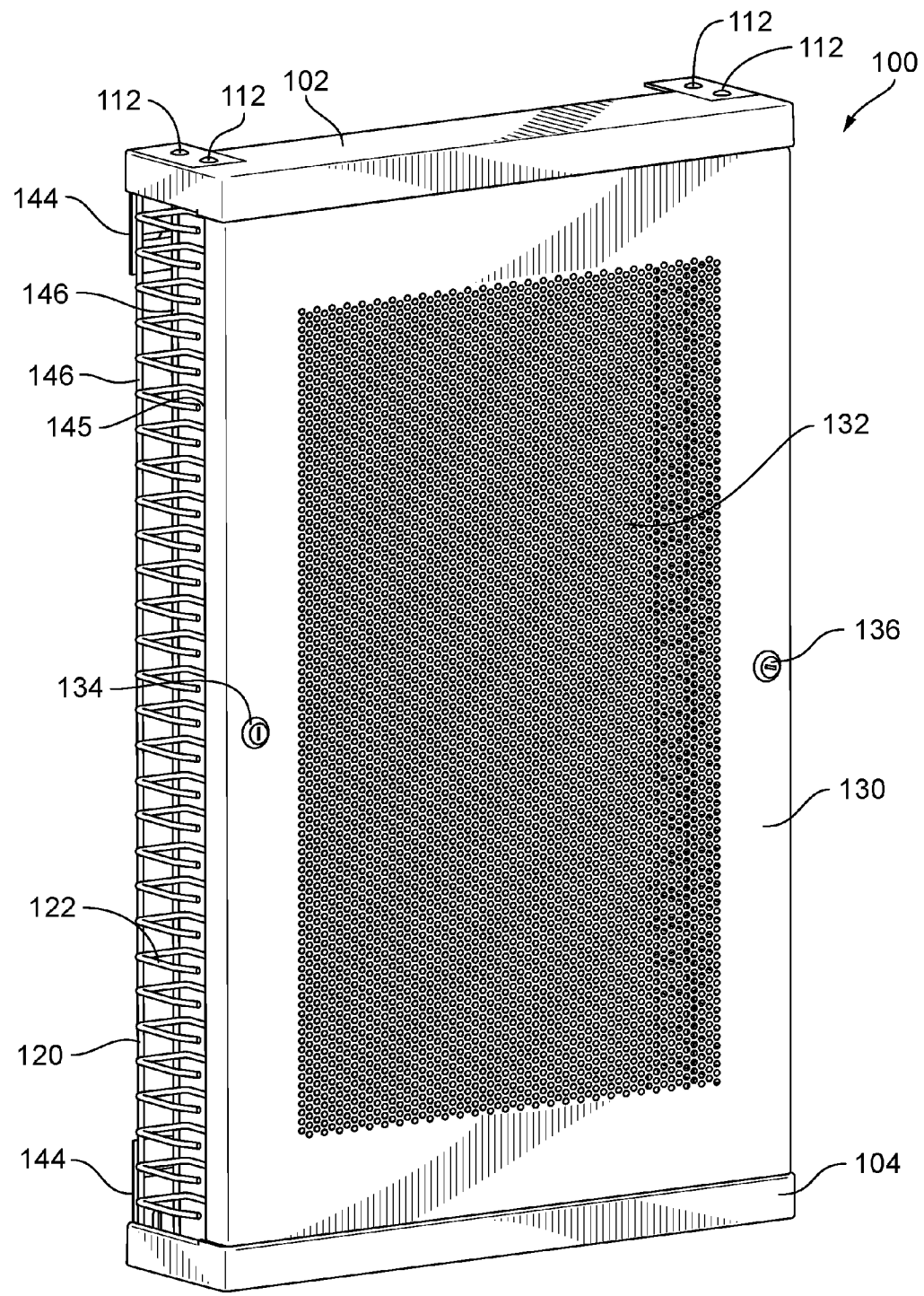
FIG. 1 is a front perspective view of a representative rack mountable security enclosure according to an illustrative embodiment of the present disclosure.

Illustrative embodiments of the present disclosure may be provided as improvements to rack mountable security enclosures. For example, a secure rack mountable enclosure according to an embodiment of the present disclosure may include built-in cable management.

Illustrative embodiment of the present disclosure provide a rack mountable security enclosure having open sides formed by horizontal rods mounted to at least one vertical rod. The open sides form a cable management system.

Illustrative embodiments of the present disclosure provide rack mountable security enclosures having locking doors capable of opening in multiple directions.

Illustrative embodiments of the present disclosure provide rack mountable security enclosures having doors with multiple locking members. When a first locking member is locked and a second locking member is unlocked, the door is capable of opening in a first direction. When the first locking member is unlocked and the second locking member is locked, the door is capable of opening in a second direction.

In certain illustrative embodiments described herein, one or more components of the rack mountable security enclosure may be constructed from metal (e.g., stamped steel, spring steel), plastic (e.g., polycarbonate or nylon) or a combination of such materials. Alternatively, steel, brass, aluminum or other appropriate alloy may be used for the appropriate components. Of course, other types of materials such as other types of plastics, composites, etc. may be used as desired and where appropriate.

A rack mountable security enclosure according to an illustrative embodiment of the present disclosure will be described by reference to FIGS. 1-3 and is referred to generally as enclosure 100. Enclosure 100 can be mounted under, over or around one or more rack mounted pieces of electronic equipment. For example, according to an embodiment of the present disclosure, the enclosure 100 is mounted to a rack utilizing a hook and latch system and fasteners screwed into threaded holes in the face of the rack as will be described in more detail below. Enclosure 100 includes a lockable door 130 for covering one or more rack mounted pieces of electronic equipment. Enclosure 100 also covers the mounting hardware used to secure enclosure 100 and the electronic equipment to the equipment rack. This protects the electronic equipment from tampering, sabotage, theft or other action that can cause disruption to the electronic equipment. Enclosure 100 includes side cable racks 120 that provide built in cable management allowing cables going to and from the electronic equipment to be neatly and strategically arranged.

Enclosure 100 includes top panel 102, bottom panel 104, side cable racks 120 and door 130. The side cable racks 120 extend between the top panel 102 and the bottom panel 104 and are secured to the top and bottom panels by, for example welded joints or mechanical fasteners. The door 130 is secured to the top panel 102 and the bottom panel 104 so that the door is movable between an open position and a closed position.

Figure 2:
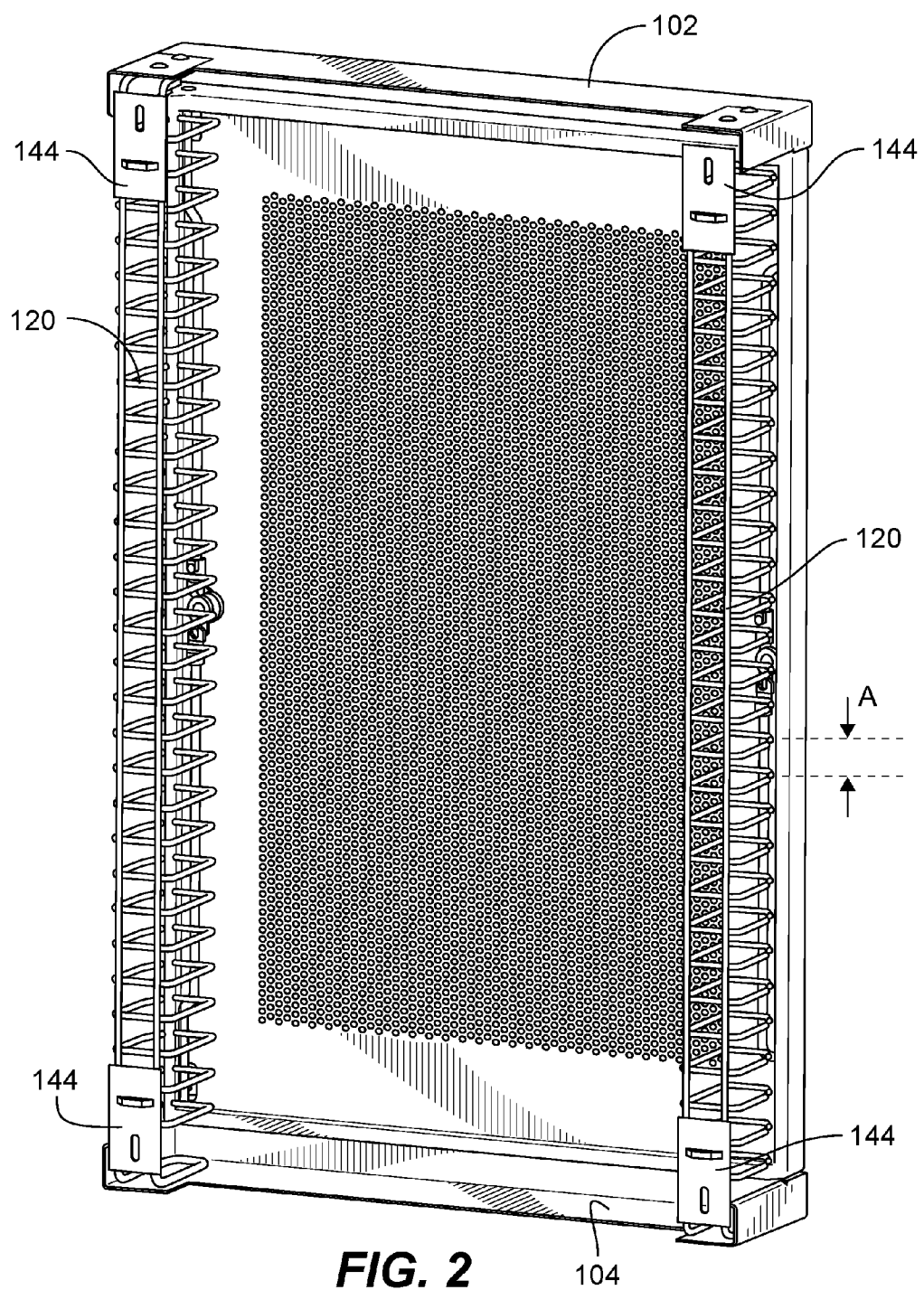
FIG. 2 is a rear perspective view of the representative rack mountable security enclosure according to an illustrative embodiment of the present disclosure.
Figure 3:
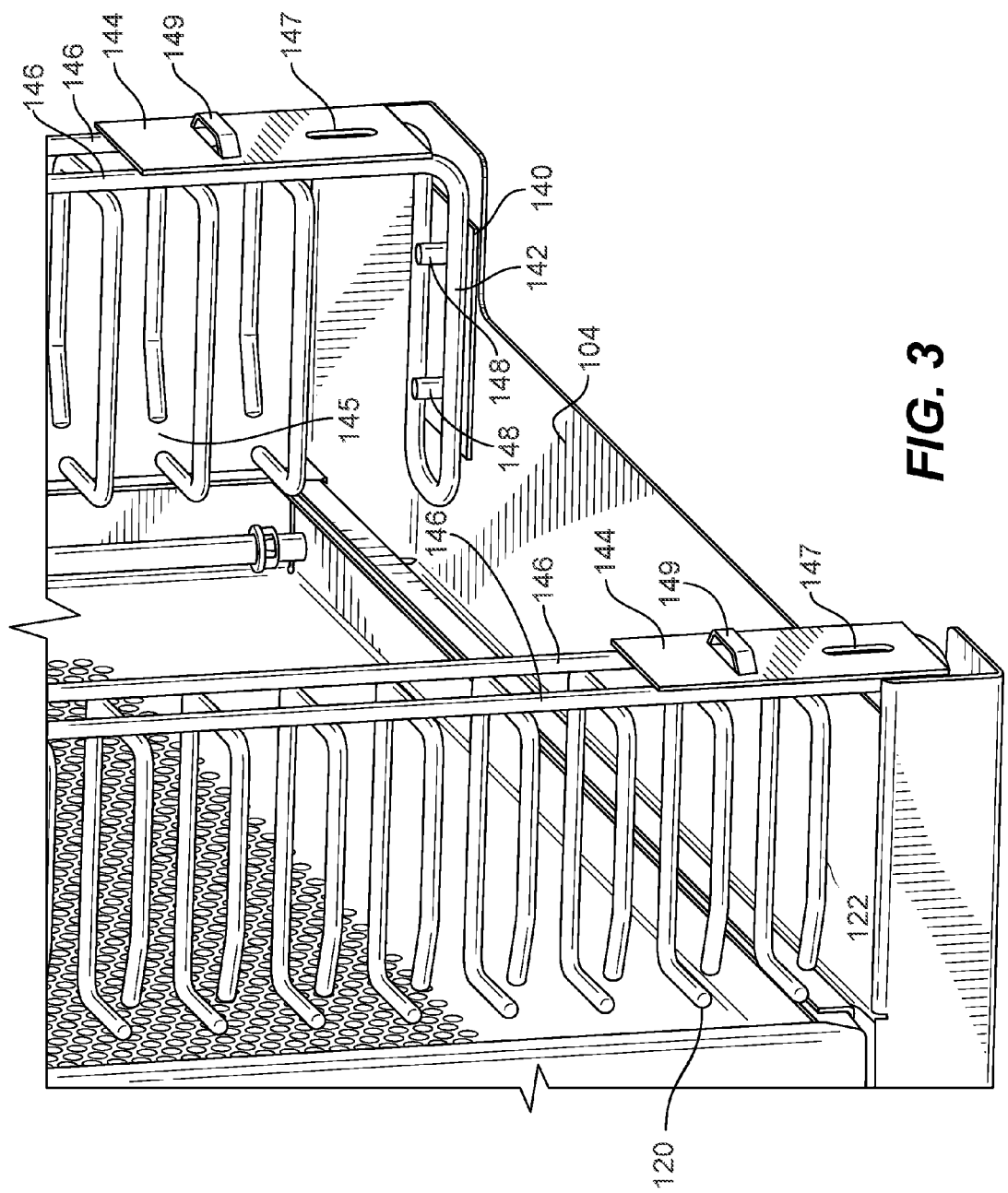
FIG. 3 is magnified partial view of a rear of a representative rack mountable security enclosure according to an illustrative embodiment of the present disclosure.
Figure 4:
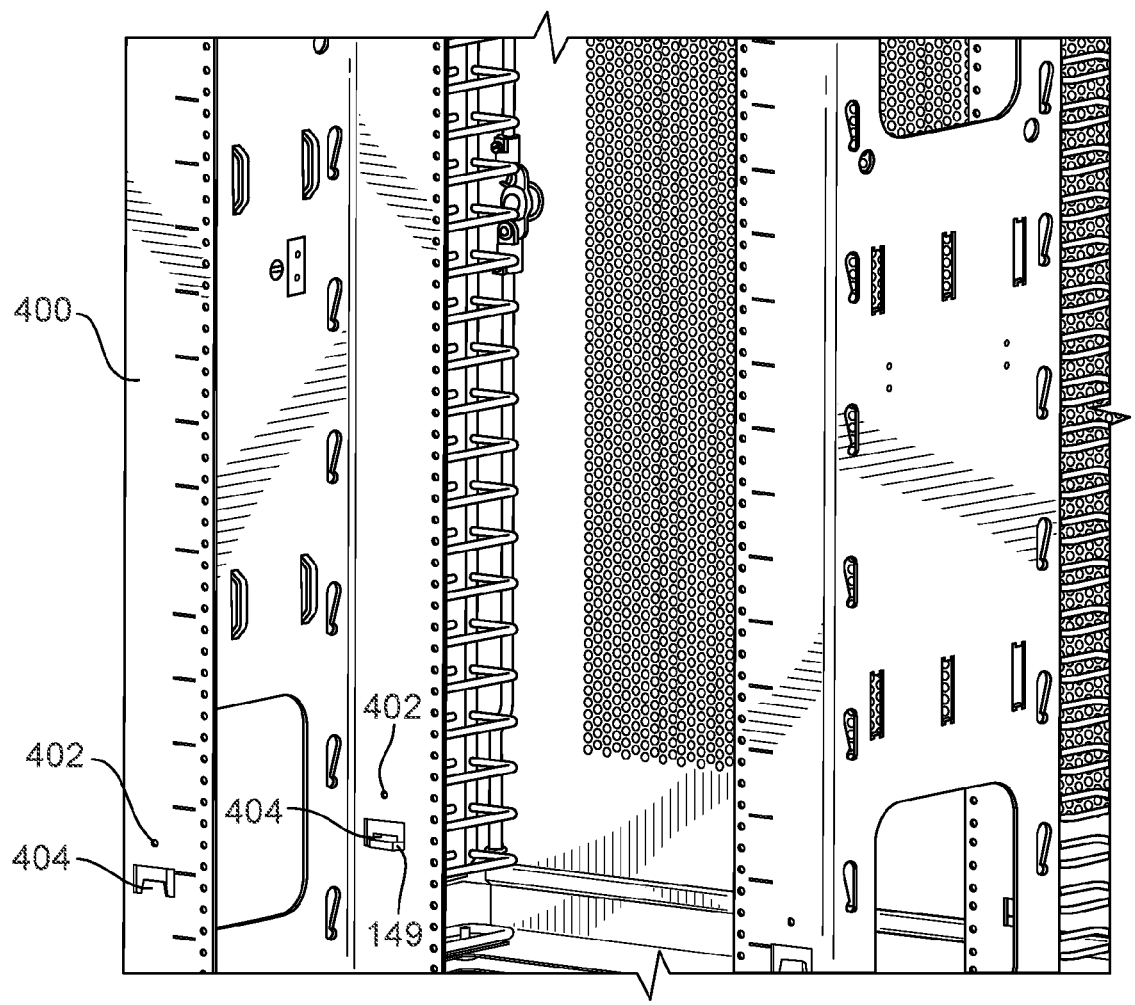
FIG. 4 is a partial rear close-up view of a rack mountable security enclosure according to an embodiment of the present disclosure mounted to a rack.

Continuing to refer to FIGS. 1-3, the side cable racks 120 each include a pair of vertical rods 146 to which fingers 122 are welded or otherwise attached. As shown in FIG. 2, the fingers 122 are separated by a vertical distance "A" which is, preferably, at least sufficiently small enough to prevent a person from inserting their hand between the fingers. As shown in FIG. 3, the ends of vertical rods 146 have 90-degree bends forming horizontal sections 142. Panel mount brackets 140 are welded or otherwise attached to horizontal sections 142. The panel mount brackets 140 each include two threaded extenders 148 which are dimensioned to align with and accept screws 112 extending through holes in the top and bottom panels 102, 104, seen in FIG. 1, to secure the panel mount brackets 140 to the top panel or the bottom panel. Rack mount brackets 144 are welded or otherwise attached to vertical rods 146 as shown. Each rack mount bracket 144 includes a catch 149 and a slot 147 allowing the enclosure 100 to be easily and securely mounted to an equipment rack. As shown in FIGS. 3 and 4, each catch 149 is dimensioned and positioned to accept a hook 404 provided on the face (front and/or back) of an equipment rack 400 to which the rack enclosure is to be mounted. When mounted to the equipment rack 400, slots 147 align with one or more threaded screw holes 402 provided in the face of the equipment rack. Screws, not shown, may then be utilized to further secure the rack enclosure to the equipment rack 400.

As shown in FIG. 1, the front face of door 130 may include perforations 132 providing additional air flow. Alternatively, the front face of door 130 may be a solid opaque surface (e.g., metal) or a solid transparent surface (e.g., acrylic plastic). The door 130 may also include one or more locking mechanisms, such as locking mechanism 134 and locking mechanism 136, which are described in more detail below.

Figure 5:
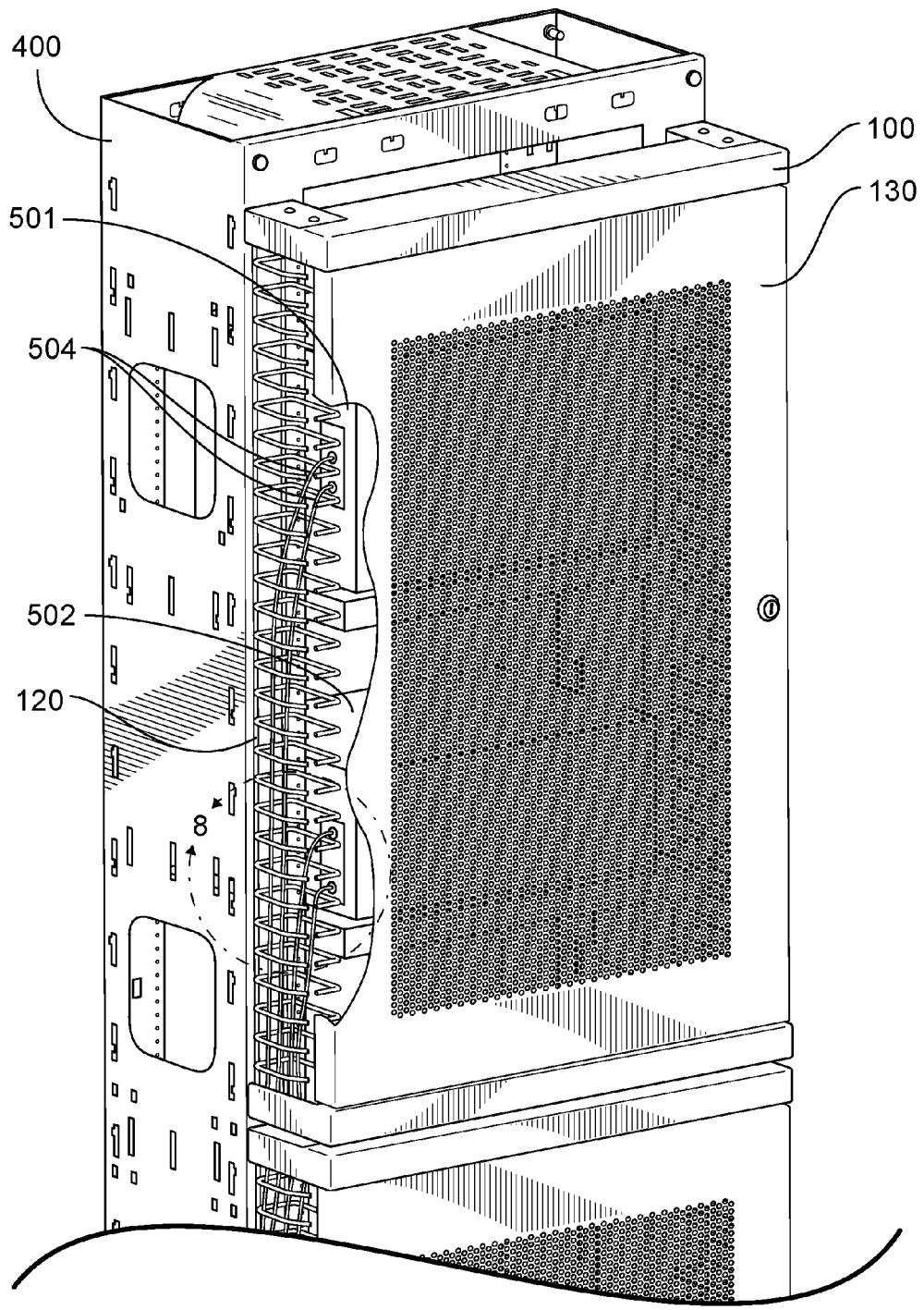
FIG. 5 is a partial front cutaway view of a rack mountable security enclosure mounted to a rack for showing a cable management system according to an illustrative embodiment of the present disclosure.
Figure 6:
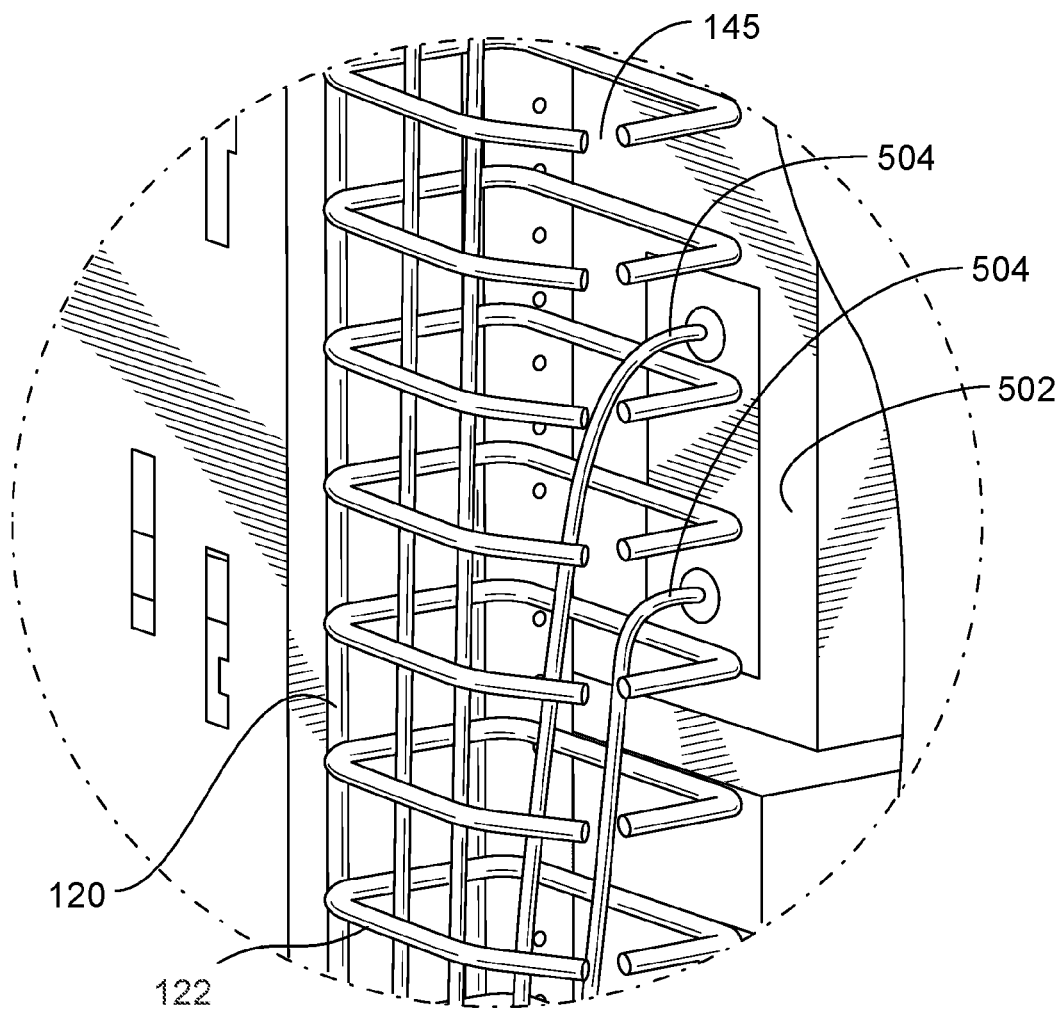
FIG. 6 is a partial magnified view of a portion of the rack mountable security enclosure shown in FIG. 7 according to an illustrative embodiment of the present disclosure.

As shown in more detail in FIGS. 5 and 6, electronic equipment 501, 502 is mounted in equipment rack 400. The electronic equipment 501, 502 has cabling 504 that extends into the side cable rack 120 of enclosure 100. When an enclosure 100 according to an embodiment of the present disclosure is mounted to the equipment rack 400, the openings 145 in the fingers 122 of the side cable rack 120 allow cabling to be easily inserted into and removed from the enclosure 100. The side cable racks 120 thus provide security preventing access to electronic equipment (501, 502) behind door 130 and yet provide easy access to the cabling 504. The side cable racks 120 also protect the cabling 504 from being pinched or otherwise damaged by the door 130 when moving between the open position and the closed position, and provide an easy and efficient readily accessible built-in cable management system. Finally, because of the openness of the side cable racks 120, air flow to the electronic equipment 501, 502 within the equipment rack 400 and covered by the enclosure 100 is maximized.

Figure 7A:
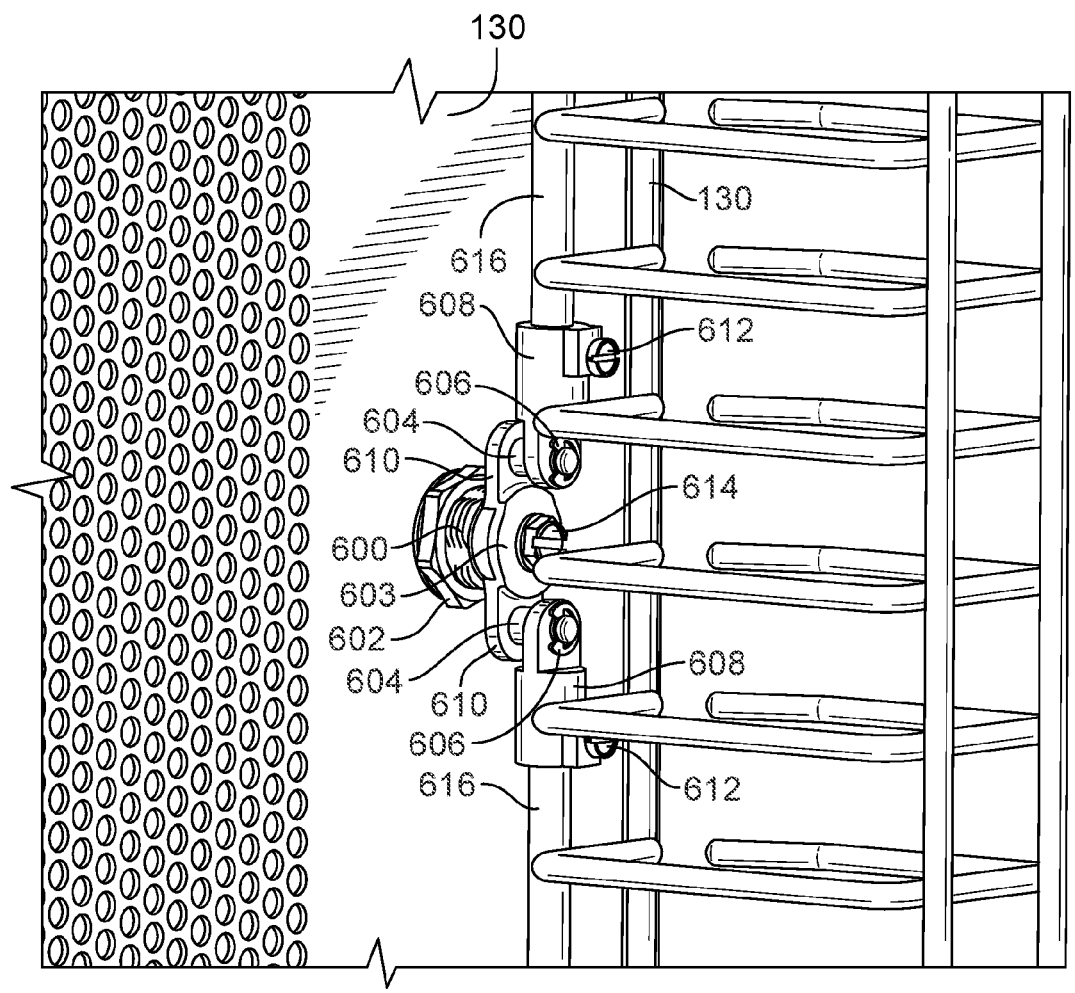
FIGS. 7A and 7B are partial magnified views of the rear of a rack mountable security enclosure for describing locking mechanisms according to an embodiment of the present disclosure.
Figure 7B:
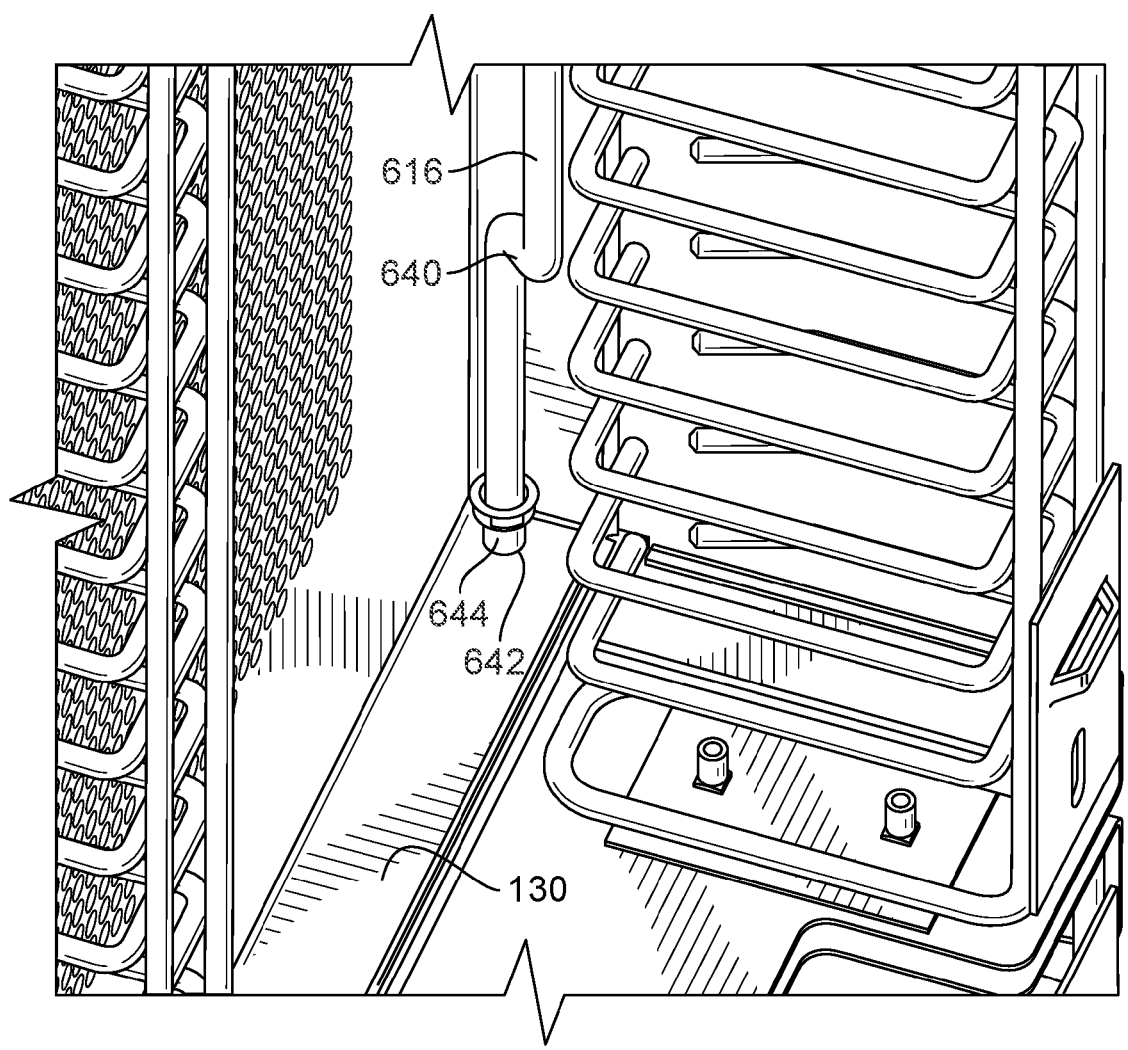

Referring to FIGS. 7A and 7B, a representative example of a locking mechanism 134, 136, seen in FIG. 1, is shown. The lock assembly 600 extends through an orifice provided in the door 130 and is secured using nut 602. An extension member 603 is mounted to a rotating member (not shown) extending through the lock assembly 600 using screw 614 such that extension member 603 rotates as a key inserted into the front of the lock assembly 600 is rotated. Extension member 603 includes a pair of arms 610, each arm 610 having a pin 604 extending therefrom as shown. Brackets 608 are pivotally mounted to pins 604 and secured in place by C-clips 606. Latch arms 616 are inserted into slots provided in the ends of brackets 608 and are secured by set screws 612. As shown in FIG. 7B, each latch arm 616 may include a portion 640 having two 90 degree offset bends. The distal end 644 of latch arm 616 slidably fits into an orifice 642 in the bottom of door 130 and through a corresponding orifice (not shown) in the top panel 102 or the bottom panel 104.

Figure 8:
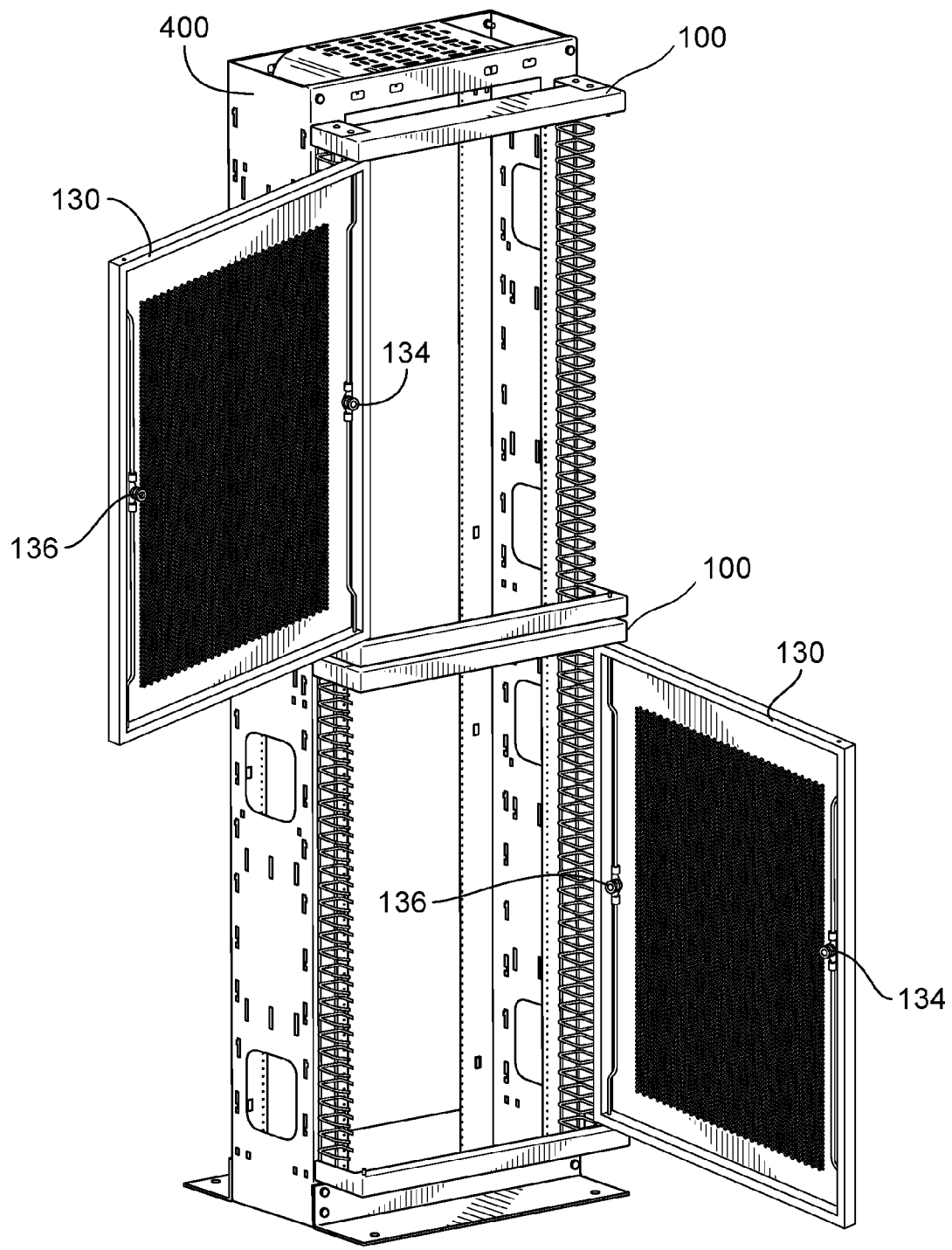
FIG. 8 is a front perspective view of a pair of rack mountable security enclosures according to an illustrative embodiment of the present disclosure mounted to a rack with the doors in open positions.

In addition to providing security, each locking mechanism 134 and 136 is capable of acting as a hinge assembly. For example, as shown in FIG. 8, when the lock mechanism 134 is locked and the lock mechanism 136 is unlocked, the lock mechanism 134 acts as a hinge assembly allowing the door 130 (e.g., see upper door) to open by swinging to the left. When the lock mechanism 136 is locked and the lock mechanism 134 is unlocked, the lock mechanism 136 acts as a hinge assembly allowing the door 130 (e.g., see lower door) to open by swinging to the right. When both lock mechanisms 134 and 136 on the door 130 are unlocked, the door can be completely removed.

Figure 9:
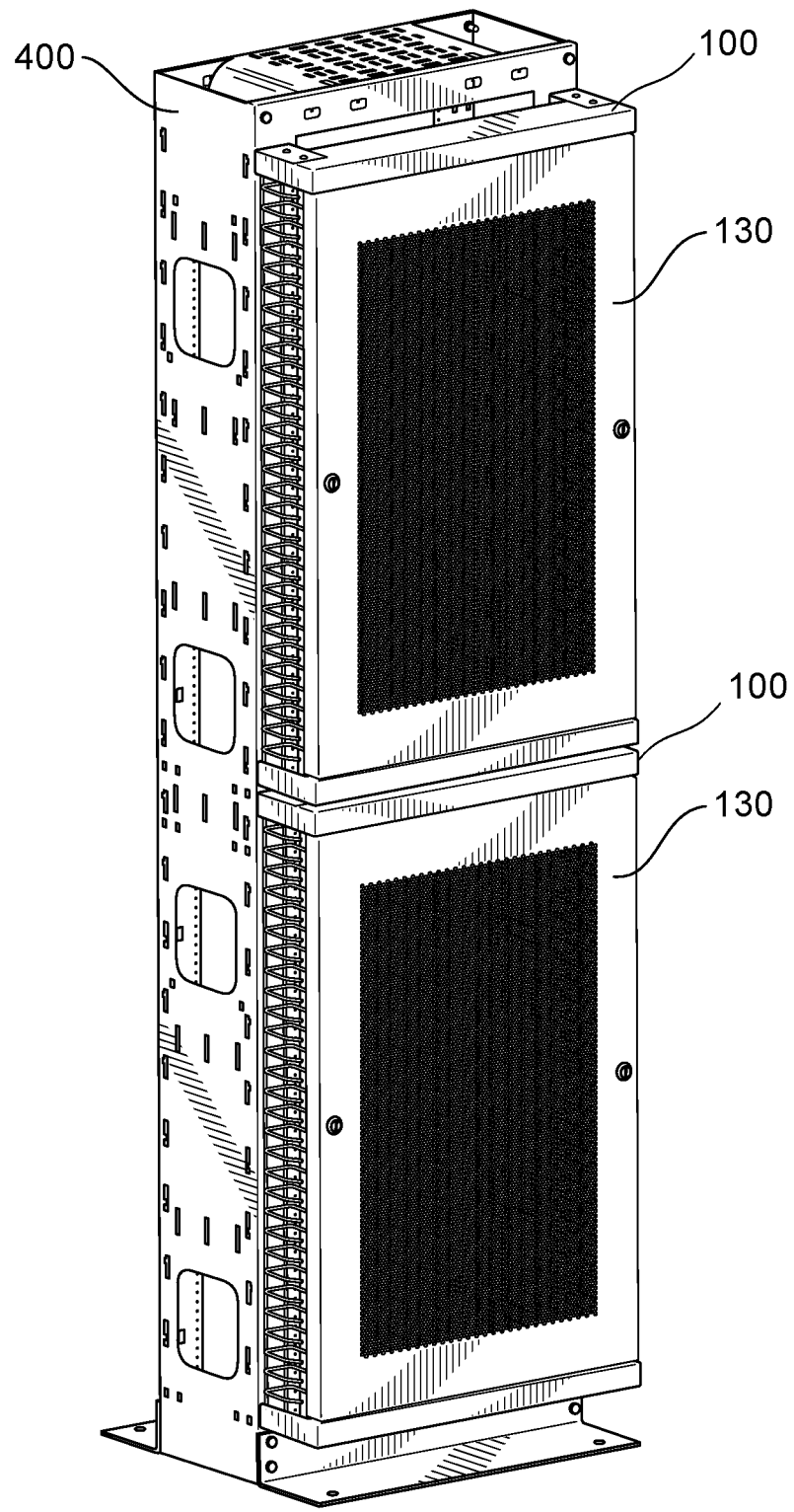
FIG. 9 is front perspective view of a pair of rack mountable security enclosures according to an illustrative embodiment of the present disclosure mounted to a rack.
Figure 10:
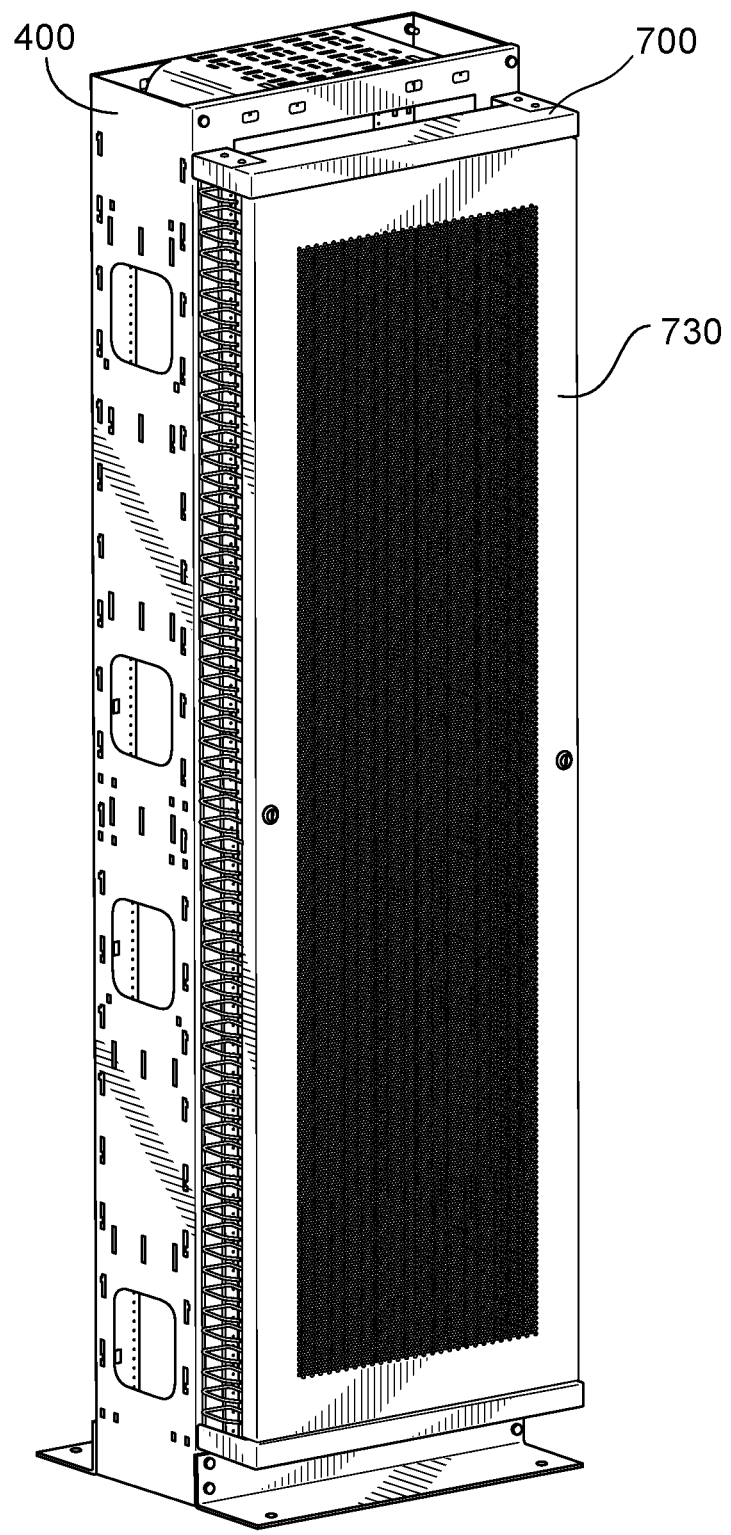
FIG. 10 is a front perspective view of a single full size rack mountable security enclosure according to an illustrative embodiment of the present disclosure mounted to a rack.
Figure 11:
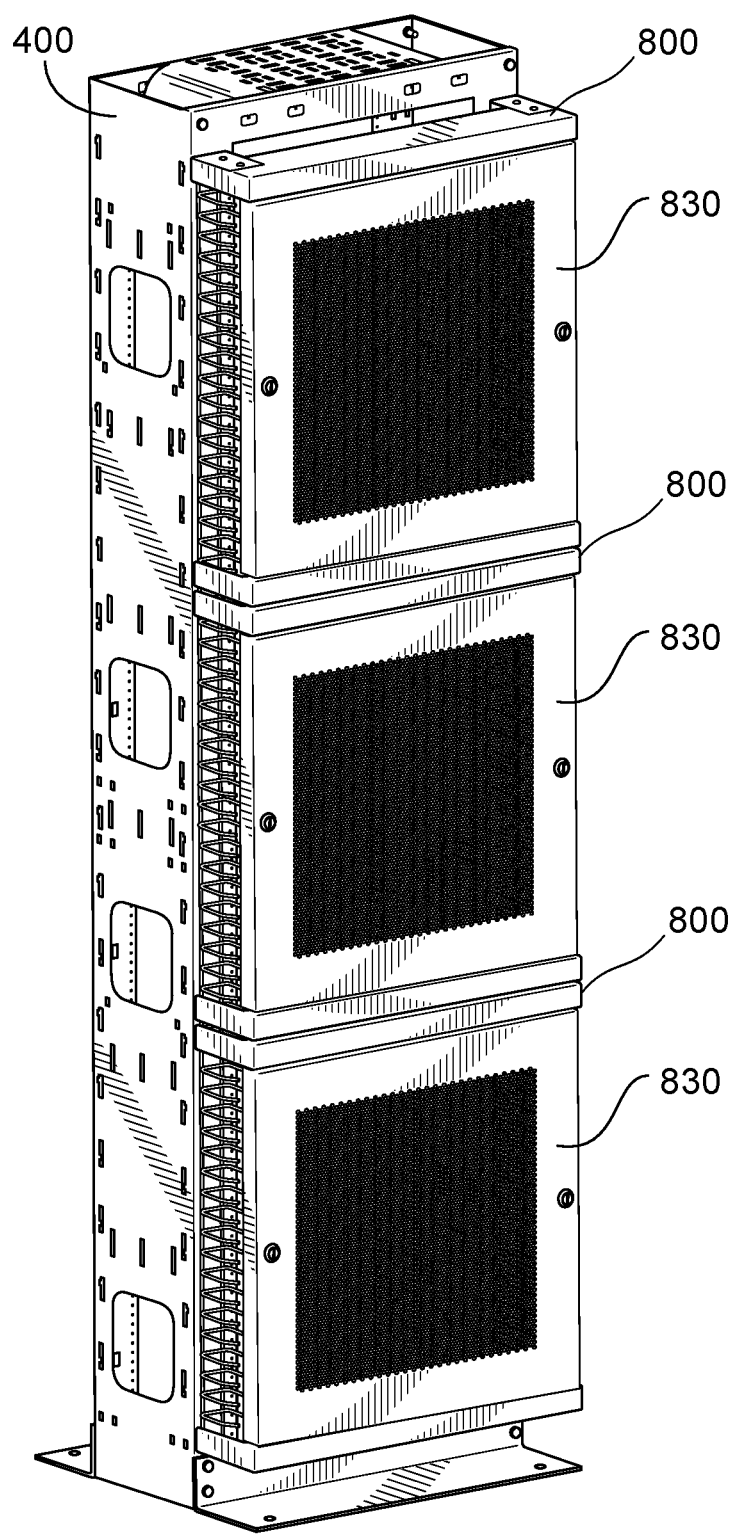
FIG. 11 is a front perspective view of multiple rack mountable security enclosures according to an illustrative embodiment of the present disclosure mounted to a rack.
Figure 12:
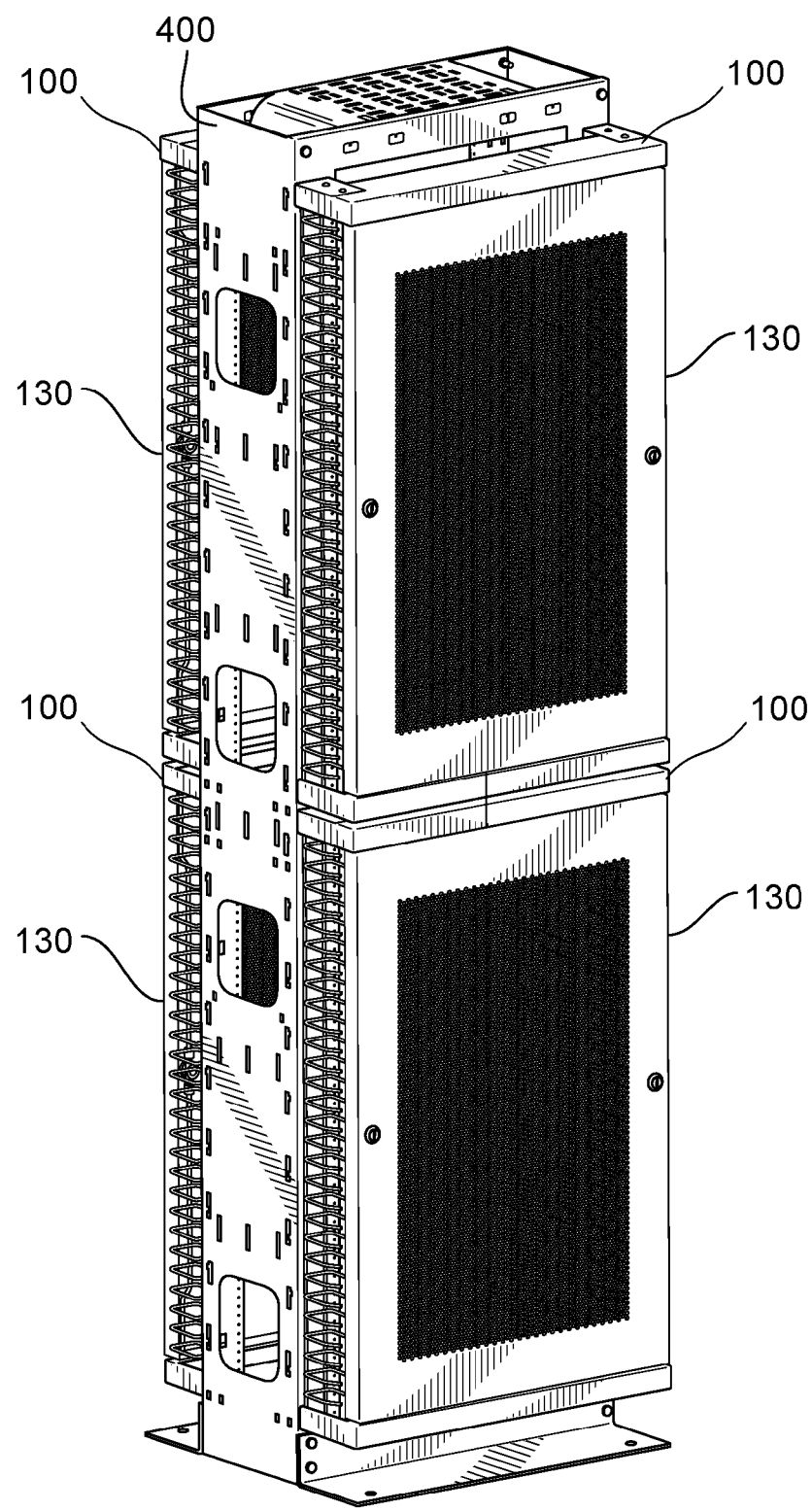
FIG. 12 is a front perspective view showing multiple rack mountable security enclosures according to an illustrative embodiment of the present disclosure mounted to a front and rear of a rack.

The enclosure according to various embodiments of the present disclosure, may be dimensioned to fit a portion of an equipment rack 400 or to fit the length of the equipment rack 400. For example, as shown in FIGS. 8 and 9, each enclosure 100 is dimensioned to cover half of the front and/or back of the equipment rack 400 and the doors 130 permit access to electronic equipment within that half portion of the equipment rack. According to another exemplary embodiment of the present disclosure shown in FIG. 10, an enclosure 700, which is substantially similar to enclosure 100 except that it is dimensioned to cover the entire front and/or back of an equipment rack 400 has a single door 730 permits access to electronic equipment within the entire equipment rack. According to another exemplary embodiment of the present disclosure shown in FIG. 11, each enclosure 800, which is substantially similar to enclosure 100 except that they are dimensioned to cover ⅓ of the front and/or back of an equipment rack 400, and the doors 830 permit access to electronic equipment within that ⅓ portion of the equipment rack. According to another exemplary embodiment of the present disclosure shown in FIG. 12, enclosures 100 may be used to cover and protect the front and back of the electronic equipment mounted in an equipment rack 400, and the doors 130 permit access to electronic equipment within that portion of the equipment rack.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A rack mountable security enclosure comprising:
    a top panel;
    a bottom panel;
    a first side cable rack extending between the top and bottom panels;
    a second side cable rack extending between the top and bottom panels, wherein the top and bottom panels and the first and second side cable racks form an opening;
    a door used to cover the opening;
    a first lock assembly having a first lock mechanism secured to the door and a first hinge assembly operatively coupled to the first lock mechanism, the first lock mechanism being movable between a locking position and an unlocking position; and
    wherein when the first lock mechanism is moved to the locking position the first hinge assembly engages the top and bottom panels to function as a hinge to permit the door to move in a first orientation between an open position and a closed position, and when the first lock mechanism is moved to the unlocking position the first hinge assembly disengages from the top and bottom panels so that the first hinge assembly no longer functions as a hinge.

2. The rack mountable security enclosure of claim 1, wherein the first and second side cable racks comprise a plurality of spaced apart fingers mounted to at least one vertical member.

3. The rack mountable security enclosure of claim 2, wherein the at least one vertical member comprises a rod like member.

4. The rack mountable security enclosure of claim 3, further comprising at least one rack mount bracket attached to the at least one vertical member, wherein the at least one rack mount bracket is configured for mounting the security enclosure to an equipment rack.

5. The rack mountable security enclosure of claim 1, wherein the first orientation is one of a right-hand swing or a left-hand swing.

6. The rack mountable security enclosure of claim 1, further comprising:
    a second lock assembly having a second lock mechanism secured to the door and a second hinge assembly operatively coupled to the second lock mechanism, the second lock mechanism being movable between a locking position and an unlocking position; and
    wherein when the second lock mechanism is moved to the locking position the second hinge assembly engages the top and bottom panels to function as a hinge to permit the door to move in a second orientation between the open position and the closed position, and when the second lock mechanism is moved to the unlocking position the second hinge assembly disengages from the top and bottom panels so that the second hinge assembly no longer functions as a hinge.

7. The rack mountable security enclosure of claim 6, wherein the first lock assembly is secured at a first side of the door and the second lock assembly is secured at a second side of the door, wherein when then the first lock mechanism is in the locking position and the second lock mechanism is in the unlocking position, the door moves in the first orientation to the open position, and wherein when then the first lock mechanism is in the unlocking position and the second lock mechanism is in the locking position, the door moves in the second orientation to the open position.

8. The rack mountable security enclosure of claim 6, wherein the second orientation is opposite the first orientation.

9. The rack mountable security enclosure of claim 8, wherein the second orientation is one of a right-hand swing or a left-hand swing.

10. A rack mountable security enclosure comprising:
a top panel;
a bottom panel;
first and second side racks each comprising a plurality of spaced apart fingers mounted to at least one vertical member, wherein each side rack extends between the top and bottom panels such that the top and bottom panels and the first and second side racks form an opening providing access to electronic equipment when the rack mountable security enclosure cover is mounted to an equipment rack;
a door used to cover the opening;
a first lock mechanism secured to the door and movable between a locking position and an unlocking position; and
a first hinge assembly operatively coupled to the first lock mechanism;
wherein when the first lock mechanism is moved to the locking position the first hinge assembly engages the top and bottom panels to function as a hinge to permit the door to move in a first orientation between an open position and a closed position, and when the first lock mechanism is moved to the unlocking position the first hinge assembly disengages from the top and bottom panels so that the first hinge assembly no longer functions as a hinge.

11. The rack mountable security enclosure of claim 10, wherein the plurality of spaced apart fingers comprise a plurality of substantially horizontal fingers.

12. The rack mountable security enclosure of claim 10, wherein the at least one vertical member comprises a rod like member.

13. The rack mountable security enclosure of claim 10, further comprising at least one rack mount bracket attached to the at least one vertical member, wherein the at least one rack mount bracket is configured for mounting the security enclosure to an equipment rack.

14. The rack mountable security enclosure of claim 10, wherein the first orientation is one of a right-hand swing or a left-hand swing.

15. The rack mountable security enclosure of claim 10, further comprising:
a second lock mechanism secured to the door and movable between a locking position and an unlocking position; and
a second hinge assembly operatively coupled to the second lock mechanism;
wherein when the second lock mechanism is moved to the locking position the second hinge assembly engages the top and bottom panels to function as a hinge to permit the door to move in a second orientation between the open position and the closed position, and when the second lock mechanism is moved to the unlocking position the second hinge assembly disengages from the top and bottom panels so that the second hinge assembly no longer functions as a hinge.

16. The rack mountable security enclosure of claim 15, wherein the first lock mechanism is secured at a first side of the door and the second lock mechanism is secured at a second side of the door, wherein when then the first lock mechanism is in the locking position and the second lock mechanism is in the unlocking position, the door moves in the first orientation to the open position, and wherein when then the first lock mechanism is in the unlocking position and the second lock mechanism is in the locking position, the door moves in the second orientation to the open position.

17. The rack mountable security enclosure of claim 15, wherein the second orientation is opposite the first orientation.

18. The rack mountable security enclosure of claim 17, wherein the second orientation is one of a right-hand swing or a left-hand swing.

19. A rack assembly comprising:
an equipment rack; and
at least one security enclosure secured to the equipment rack, wherein the at least one rack mountable security enclosure comprises:
a top panel;
a bottom panel;
a first side cable rack extending between the top and bottom panels;
a second side cable rack extending between the top and bottom panels, wherein the top and bottom panels and the first and second side cable racks forming an opening;
a door used to cover the opening;
a first lock assembly having a first lock mechanism secured to the door and a first hinge assembly operatively coupled to the first lock mechanism, the first lock mechanism being movable between a locking position and an unlocking position; and
wherein when the first lock mechanism is moved to the locking position the first hinge assembly engages the top and bottom panels to function as a hinge to permit the door to move in a first orientation between an open position and a closed position, and when the first lock mechanism is moved to the unlocking position the first hinge assembly disengages from the top and bottom panels so that the first hinge assembly no longer functions as a hinge.

20. The rack assembly of claim 19, wherein the first and second side cable racks comprise a plurality of spaced apart fingers joined together by at least one vertical member.

21. The rack assembly of claim 20, wherein the at least one vertical member comprises a rod like member.

22. The rack assembly of claim 20, further comprising at least one rack mount bracket attached to the at least one vertical member, wherein the at least one rack mount bracket is configured for mounting the security enclosure to an equipment rack.

23. The rack assembly of claim 19, wherein the first orientation is one of a right-hand swing or a left-hand swing.

24. The rack assembly of claim 19, further comprising:
a second lock assembly having a second lock mechanism secured to the door and a second hinge assembly operatively coupled to the second lock mechanism, the second lock mechanism being movable between a locking position and an unlocking position; and
wherein when the second lock mechanism is moved to the locking position the second hinge assembly engages the top and bottom panels to function as a hinge to permit the door to move in a second orientation between the open position and the closed position, and when the second lock mechanism is moved to the unlocking position the second hinge assembly disengages from the top and bottom panels so that the second hinge assembly no longer functions as a hinge.

25. The rack assembly of claim 24, wherein the first lock assembly is secured at a first side of the door and the second lock assembly is secured at a second side of the door, wherein when then the first lock mechanism is in the locking position and the second lock mechanism is in the unlocking position, the door moves in the first orientation to the open position, and wherein when then the first lock mechanism is in the unlocking position and the second lock mechanism is in the locking position, the door moves in the second orientation to the open position.

26. The rack assembly of claim 24, wherein the second orientation is opposite the first orientation.

27. The rack assembly of claim 26, wherein the second orientation is one of a right-hand swing or a left-hand swing.

* * * * *